June 27, 1944. R. N. BURNETT 2,352,368
VALVE
Filed July 12, 1941 2 Sheets-Sheet 1
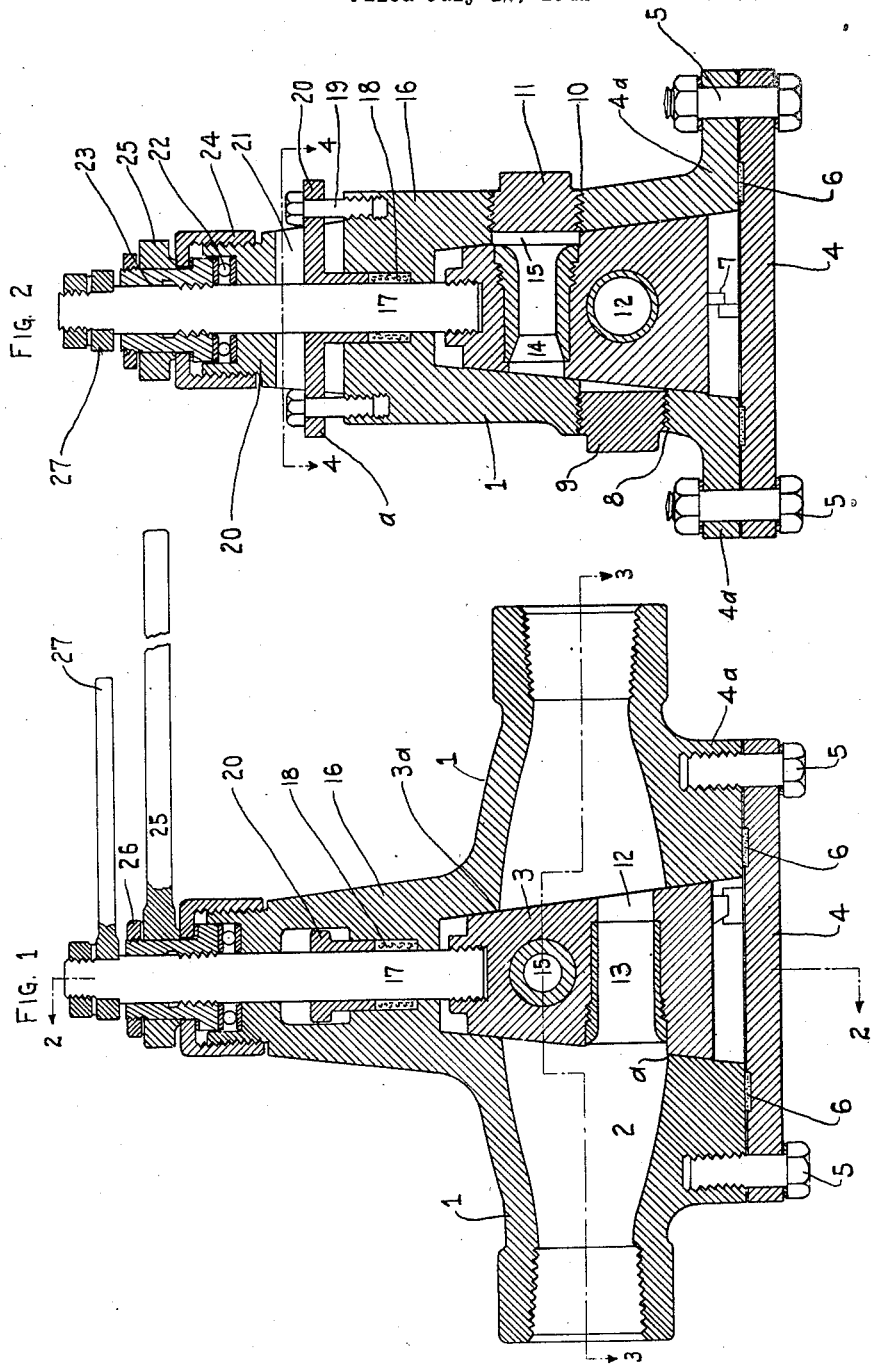
INVENTOR
ROBT. N. BURNETT, DECEASED.
BY SYLVESTER HOFFMAN (EXECUTOR)
Philip Subkow
ATTORNEY June 27, 1944.　　　R. N. BURNETT　　　2,352,368
VALVE
Filed July 12, 1941　　　2 Sheets-Sheet 2
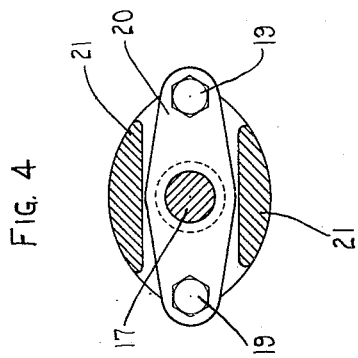
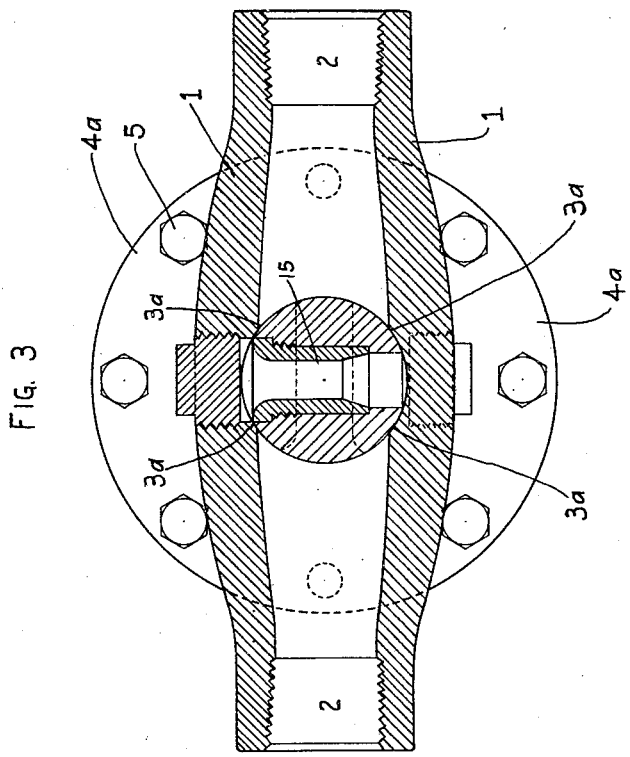
INVENTOR
ROBT. N. BURNETT, DECEASED.
BY SYLVESTER HOFFMAN (EXECUTOR)
ATTORNEY Patented June 27, 1944

2,352,368

UNITED STATES PATENT OFFICE 2,352,368

VALVE

Robert N. Burnett, deceased, late of Monrovia, Calif., by Sylvester Hoffmann, executor, Glendale, Calif.

Application July 12, 1941, Serial No. 402,164

4 Claims. (Cl. 138—46)

This invention relates to a variable orifice plug valve, particularly useful in oil well operation. Oil wells flow at casing head pressures which may run as high as 6000 pounds per square inch. It is frequently necessary to adjust the flows of these wells. The present practice is to use what is known as "beans" or constrictions in the flow line. When it becomes necessary to change the volume of flow or the pressure drops desired in flow lines, it is necessary to replace these beans with orifices of different diameter. Since it is frequently dangerous to shut in the well in order to obtain the opportunity to change the bean, by-pass connections are necessary in order that the flow may be by-passed around the bean while the change is made. This requires elaborate and costly installations. For this reason "variable beans" have been devised. These are essentially needle valves. These valve structures are subject to erosion and cutting.

It is an object of this invention to devise a high pressure valve which will permit the changing of the diameter of the bean without interrupting flow.

The variable bean valve of this invention comprises a plug valve which, as is known, is capable of operating at very high pressures. The plug is provided with a plurality of orifices or ports into which can be placed beans of varying diameters.

The variable bean valve of this invention is so constructed that one may be changed while the other is in the direction of flow so that the change may be made without interrupting the flow through the valve.

This invention will be better understood by reference to the drawings of the preferred embodiment of the invention. In these drawings:

Fig. 1 is a vertical section of the valve in which the valve stem and the bolts are not shown in section;

Fig. 2 is a vertical section taken on line 2—2 of Fig. 1, the bolts and stem not being shown in section.

Fig. 3 is a horizontal section taken on line 3—3 of Fig. 1.

Fig. 4 is a fragmentary section taken along line 4—4 of Fig. 2, to illustrate the gland and bonnet arrangement.

The valve is composed of a body 1, containing a core or passage 2. The body is provided with a vertical conical seat 3a, into which is seated a conical plug 3. The plug is inserted through the flanged bottom 4a of the valve body into the conical seat. This opening is closed by the plate 4 and sealed by means of the gasket 6 and held securely by bolts 5 against the flange 4a.

The conical plug 3 is provided with a plurality of passages, shown as two in the drawings, these passages being marked 12 and 14. Into these passages are screwed removable beans 13 and 15, which may be of the desired diameters to be determined by the flow which is desired through the valve. In the body of the valve are openings 8 and 10 which are sealed by plugs 9 and 11. These openings are designed to register with the openings 12 and 14.

The plug is rotated by a valve stem 17 which passes through a stuffing box 18 in the valve bonnet 16. The stuffing box is secured by a gland 20 held in place by bolts 19. The insertion of the gland 20 is provided for by coring of the valve bonnet as shown in Fig. 4. The valve stem is rotated by the arm 27 and is locked in place by the locking arm 25. The operation of the valve will appear from the description given above. The plug is locked in place by the arm 25 which, on rotation, forces the plug 3 downward to wedge it in place in the conical seat 3a. On relieving the downward pressure by a counter rotation of the arm 25, the plug may again be rotated.

In the position shown in Figs. 1 and 2, the flow is directed through passage 13. The orifice 15 is cut off from the flow as shown in Fig. 2, being sealed against the cooperating surface of the conical seat 3a. If it is desired to change the orifice of flow, plug 11 may be removed and the orifice 15 withdrawn by unscrewing (wrench notches being provided for this purpose), and a different bean introduced. During this operation the passage of the fluid is prevented from discharging through the opening 10, the plug sealing off against the conical seat 3a. The plug 11 is then introduced and the valve stem given a quarter rotation and the opening 14 is now in the direction of flow, and the opening 12 is placed in a direction perpendicular to the direction of flow of the fluid and in register with the opening 8. It is sealed off from the flow by the cooperating surface of the conical seat 3a. In order to facilitate the positioning of the openings, stops such as 7 are provided so that the plug may be rotated into position against the stop upon a 90° turn. In this position the passageway 12 is now perpendicular to the flow, and is sealed off from the flow by the cooperating surface 3a, and may then be replaced by opening plug 9, as will be understood from the drawings.

In this manner it is possible to replace the openings through the valve wall, keeping the opening which is to be altered sealed off from the flow of the fluid and maintaining this flow through another opening provided in the plug body.

It is to be understood that the foregoing description of an embodiment of this invention is illustrative only and various changes and modifications may be made therein without departing from the spirit of the appended claims.

What is claimed is:

1. A variable bean valve comprising a valve body having a fluid passage therethrough, a conical seat in said body, a rotatable plug in said seat, a plurality of ports in said plug, said ports being placed in said plug at an angle to each other, removable beans in said ports, a plurality of openings in said valve body cooperating with said ports whereby on rotation of said plug each of said ports may be brought into registry with certain ones of said cooperating openings, the edges of the port in registry with said openings being sealed against the cooperating surface of said seat when said port is in registry with said cooperating opening and the opposite end of said port being sealed by said plug against the opposite wall of said seat whereby the bean may be removed from said port while said port is sealed from said fluid passage, and another of said ports being open to said fluid passageway while said first named port is in registry with its cooperating opening, whereby fluid in said passageway may pass through said port while the bean is changed in said registering port, and means for rotating said open port into registry with another opening and said first named registering port into a position open to said fluid passageway whereby fluid in said fluid passageway may pass through said last named port and removable closures for said openings.

2. A variable bean valve comprising a valve body having a fluid passage therethrough, a conical seat in said body, a rotatable plug in said seat, a plurality of ports in said plug, said ports being placed in said plug at right angles to each other, removable beans in said ports, a plurality of openings in said valve body cooperating with said ports whereby on rotation of said plug each of said ports may be brought into registry with certain ones of said cooperating openings, the edges of the port in registry with said openings being sealed against the cooperating surface of said seat when said port is in registry with said cooperating opening and the opposite end of said port being sealed by said plug against the opposite wall of said seat whereby the bean may be removed from said port while said port is sealed from said fluid passage, and another of said ports in line with and open to said fluid passageway while said first named port is in registry with its cooperating opening, whereby fluid in said passageway may pass through said port while the bean is changed in said registering port, and means for rotating said open port into registry with another opening and said first named registering port into a position in line with said fluid passageway and open to said fluid passageway whereby fluid in said fluid passageway may pass through said last named port and removable closures for said openings, and a flange closure base for said valve body, a stop on said flange closure base, and a stop in the base of said plug cooperating with the stop on said closure base whereby said plug may be rotated through an angle of 90° to bring said plugs into registry with its cooperating opening.

3. A variable bean valve, comprising a valve body having a fluid passage therethrough, a rotatable plug in said valve, a seat for said plug, a plurality of ports in said plug placed at an angle to each other, removable beans in said ports, a plurality of openings in said valve body cooperating with each of said ports, whereby on rotation each of said ports may be brought into registry with certain ones of said cooperating openings, said ports being sealed from the fluid passageway when said port is in registry with said cooperating opening, whereby the bean may be removed from said port while said port is sealed from said fluid passageway, another of said ports being open to said fluid passageway while said first-named port is in registry with its cooperating opening, whereby fluid in said passageway may pass through said port while the bean is changed in said registering port, and means for rotating said open port into registry with another opening and said first-named registering port into a position open to said fluid passageway whereby fluid in said fluid passageway may pass through said last-named port.

4. A variable bean valve, comprising a valve body having a fluid passage therethrough, a rotatable plug in said valve, a seat for said plug, a plurality of ports in said plug placed at a right angle to each other, removable beans in said ports, a plurality of openings in said valve body cooperating with each of said ports, whereby on rotation each of said ports may be brought into registry with certain ones of said cooperating openings, said ports being sealed from the fluid passageway when said port is in registry with said cooperating opening, whereby the bean may be removed from said port while said port is sealed from said fluid passageway, another of said ports being open to said fluid passageway while said first-named port is in registry with its cooperating opening, whereby fluid in said passageway may pass through said port while the bean is changed in said registering port, and means for rotating said open port into registry with another opening and said first-named registering port into a position open to said fluid passageway whereby fluid in said fluid passageway may pass through said last-named port.

SYLVESTER HOFFMANN,
*Executor of the Estate of Robert N. Burnett, Deceased.*